United States Patent [19]
Kim

[11] Patent Number: 6,043,950
[45] Date of Patent: Mar. 28, 2000

[54] APPARATUS OF CONTROLLING DISK DRIVE DURING INITIAL STAGES OF WAKE-UP MODE AND METHOD THEREOF

[75] Inventor: Hyung-Kyoon Kim, Seoul, Rep. of Korea

[73] Assignee: Samsung Electronics Co., Ltd., Kyungki-do, Rep. of Korea

[21] Appl. No.: 08/990,464

[22] Filed: Dec. 15, 1997

[30]     Foreign Application Priority Data

Dec. 13, 1996 [KR]  Rep. of Korea ................ 96-65536

[51] Int. Cl.$^7$ ...................................................... G11B 5/55
[52] U.S. Cl. ............................................ 360/73.03; 360/75
[58] Field of Search .............................. 360/73.03, 75, 360/71, 69; 369/50, 54

[56]              References Cited

U.S. PATENT DOCUMENTS

| | | | |
|---|---|---|---|
| 4,918,743 | 4/1990 | Tsuyuguchi | 360/73.03 |
| 5,001,578 | 3/1991 | Yamauchi | 360/73.03 |
| 5,099,368 | 3/1992 | Okamura | 360/73.03 |
| 5,157,560 | 10/1992 | Kanda et al. | 360/73.03 |
| 5,239,652 | 8/1993 | Seibert et al. | 360/69 |
| 5,345,347 | 9/1994 | Hopkins et al. | 360/71 |
| 5,381,279 | 1/1995 | Dunn | 360/73.03 |
| 5,452,277 | 9/1995 | Bajorek et al. | 360/75 |
| 5,488,274 | 1/1996 | Satoh | 360/73.03 |
| 5,589,996 | 12/1996 | Patrick et al. | 360/73.03 |
| 5,671,099 | 9/1997 | Ishii et al. | 360/75 |
| 5,801,894 | 9/1998 | Boutaghou et al. | 360/75 |

*Primary Examiner*—Nabil Hindi
*Attorney, Agent, or Firm*—Sughrue, Mion, Zinn, Macpeak & Seas, PLLC

[57]              ABSTRACT

An apparatus implements a method of controlling a disk drive during initial stages of a wake-up mode when input of a command to the disk drive occurs during a sleep mode. Immediately upon receipt of a command input to a microprocessor controller (21) of the disk drive during sleep mode, power is restored to circuits (except for the spindle motor driver circuit) which were disabled during sleep mode. Then, a discrimination is made whether the input command is for picking up data from the disk and driving the disk to process the data. The discrimination is made by comparing the input command with a predetermined reference command stored in a memory (22) associated with the microprocessor. If the input command is not for driving the disk, the command is performed immediately. On the other hand, if the input command is determined to be for driving the disk, the command is performed only after power is applied to the spindle motor driver circuit (24) and the microprocessor controller (21) stands by for a predetermined time period. The stand by time period is to allow rotational speed of the disk to stabilize after energizing the motor driver to spin the disk. Accordingly, malfunctions caused by instability of the disk drive controller in the initial wake-up mode are be prevented.

8 Claims, 2 Drawing Sheets

6,043,950

APPARATUS OF CONTROLLING DISK DRIVE DURING INITIAL STAGES OF WAKE-UP MODE AND METHOD THEREOF

BACKGROUND OF THE INVENTION

The present invention relates to an apparatus and method for controlling a disk drive and a method thereof. More particularly, the present invention is directed to a disk drive controlling apparatus for preventing malfunction during initial stages of a mode change from a sleep mode to a wake-up mode, and a method performed using such apparatus.

This application for an apparatus for controlling a disk drive during initial stages of wake-up mode is based on Korean Patent Application No. 96-65536, which is incorporated herein by reference for all purposes.

In general, in an information storage device drive such as a CD-ROM drive, a sleep mode is employed for reducing power consumption. In a sleep mode of the CD-ROM drive, the power supply is cut off from a drive IC for controlling the rotation of a spindle motor, as well as from various devices for processing data, when commands are not input for a predetermined time.

When a command is input by a user or a command is sent by a host computer, the mode of the CD-ROM drive changes from a sleep mode to a wake-up mode. In a wake-up mode, the power supply once again supplies power to the drive to rotate the spindle motor at a predetermined speed, to perform commands, as opposed to the sleep mode in which power is interrupted to the drive IC and to various devices for processing data.

However, according to the conventional method, since the command is performed during initial stages of a wake-up mode, a malfunction can be generated because the controller for rotating the disk is instable during the very initial stages of the wake-up mode.

SUMMARY OF THE INVENTION

To solve the above problem, it is an object of the present invention to provide an apparatus and a method for controlling a disk drive, during initial stages of a wake-up mode, so as to perform a received command after the disk drive has been stabilized.

To accomplish the above object of the present invention, method is provided for controlling a disk drive (which includes a microprocessor) during initial stages of a wake-up mode which interrupts a sleep mode of the disk drive to perform commands. The method includes the steps of:

(a) determining whether a predetermined command is input to the microprocessor during the sleep mode;

(b) applying a power to a predetermined device and enabling predetermined chips for the microprocessor, when the predetermined command is input;

(c) determining whether the predetermined command is for picking up data from the disk and driving the disk to process the data;

(d) performing the command, if it is determined that the command is not for driving the disk;

(e) standing by for a predetermined time to allow rotation of the disk to stabilize if the command is determined to be for driving or accessing the disk; and (f) performing the predetermined command after the step of standing by.

To accomplish another object of the present invention, an apparatus is provided for controlling a disk drive during initial stages of a wake-up mode so as to prevent malfunction during performance of commands. The inventive apparatus includes a memory for classifying and storing commands for driving a disk. Additionally, the inventive apparatus has a system controller for driving the disk and performing a received command after a predetermined standby time to allow stabilization, if the command in the sleep mode is stored in the memory, and otherwise performing the received command immediately.

BRIEF DESCRIPTION OF THE DRAWINGS

The above objects and advantages of the present invention will become more apparent as a preferred embodiment of the invention is described in detail below, with reference to the attached drawings in which.

DETAILED DESCRIPTION OF THE INVENTION

The apparatus of controlling a disk drive during initial stages of a wake-up mode according to the present invention (see FIG. 2) includes a system controller 21, a memory 22, a power supply 23, and a servo unit 24. Operations of these elements will be described as follows.

The system controller 21 (e.g., a microprocessor) controls mode changes from a sleep mode to a wake-up mode or vice-versa, to thereby control power flow from the power supply 23 to a motor connected to the servo unit 24. The system controller 21 receives commands. Of the commands received by the system controller 21, the memory 22 stores only commands which are for driving a disk.

The power supply 23 supplies electrical power to other blocks in the system according to the control operation of the system controller 21. The servo unit 24 controls the rotation of a spindle motor (not shown) according to the commands received by the system controller 21.

Figure 1:
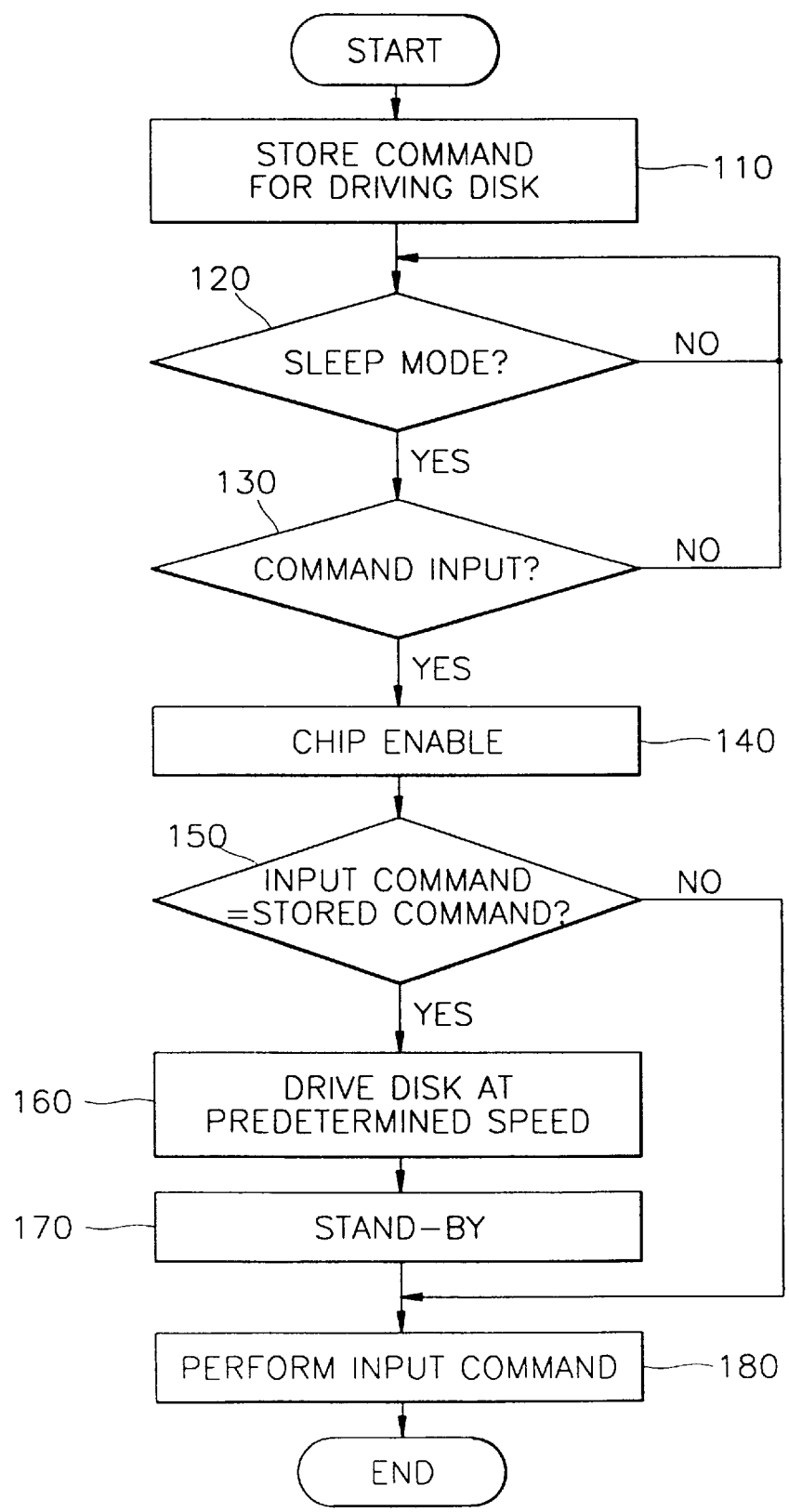
FIG. 1 is a flow chart illustrating a method of controlling a disk drive during initial stages of a wake-up mode according to the present invention.
Figure 2:
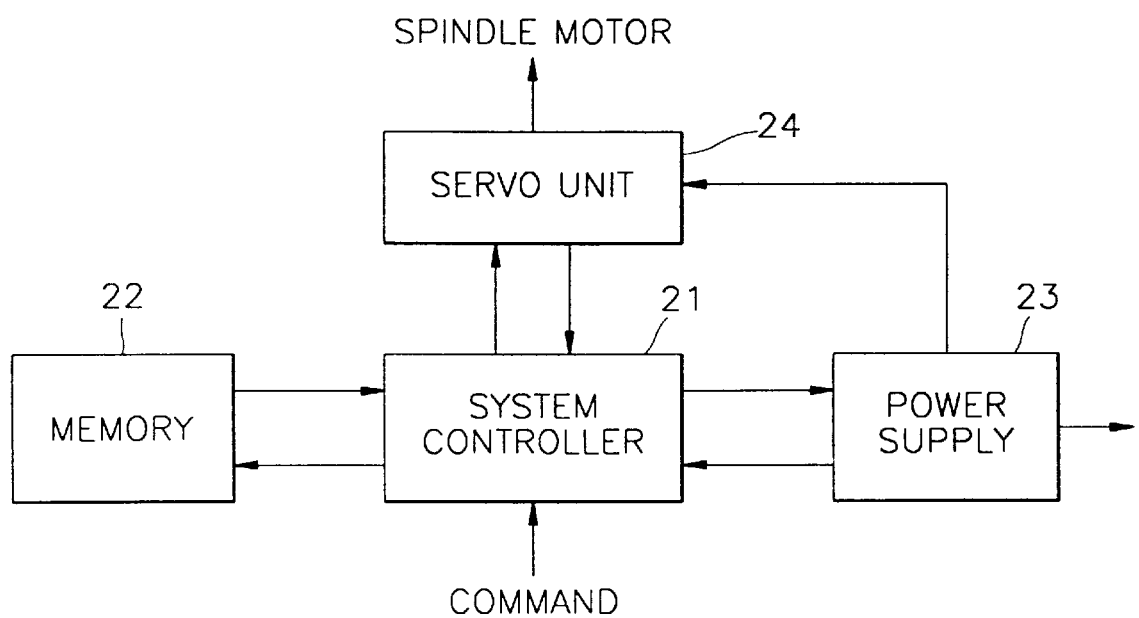
FIG. 2 is a block diagram of an apparatus for controlling a disk drive during initial stages of a wake-up mode according to the present invention.

FIG. 1 is a flow chart showing a series of operations of the system controller 21 of FIG. 2.

As shown in FIG. 1, a method of stabilizing a disk controller during initial stages of a wake-up mode includes the steps of storing one or more commands for driving a disk (step 110), determining whether the drive is in a sleep mode (step 120), determining whether a command has been input (step 130), enabling the chip (step 140), comparing input and stored commands (step 150), driving a disk at a predetermined speed (step 160), standing by (step 170), and performing input commands (step 180).

In the step 110 of storing commands, only a command corresponding to the function of driving a disk to pick up data recorded on the disk is selected to be stored in the memory 22. This is for preventing command performance errors caused by instability of the disk drive controller during initial stages of a wake-up mode.

Step 120 determines whether the drive is in a sleep mode. The sleep mode interrupts the power supply to the servo unit 24 and to other predetermined chips related to the system controller 21 for the purpose of reducing power consumption by disabling the chips. The sleep mode is automatically started when no command is input to the system controller 21 for a predetermined time period.

Step 130 determines whether an external key command has been input by a user or a command has been input by the computer.

In the step 140, the predetermined chips related to the system controller 21 which were disabled during the sleep mode are enabled. The enablement is made by reconnecting each of the devices (other than the servo unit) to the power supply which had been disabled in the sleep mode.

In the step 150, the input command is compared to the command stored in the memory 22. When the received command is equal to the command stored in the memory 22, the step 160 of driving the disk is performed. If the received command does not equal the stored command, the step 180 of performing the command is executed. This is for preventing errors due to instability of the disk drive controller during initial stages of a wake-up mode. That is, when the received command is not for driving the disk, the received command is performed, otherwise, the command is performed after stabilizing the disk drive controller.

In the step 160 of driving a disk, the spindle motor rotates to drive the disk at a predetermined speed of the disk.

In the standby step 170, the system controller 21 is on standby to secure time required for the spindle motor of the disk drive to stably rotate the disk at a predetermined speed. That is, no data is read from the disk during the standby time period so as to avoid data read errors due to unstable rotation speed.

In the step 180, the command received by the controller is performed.

The prevention of data read malfunctions during initial stages of a wake-up mode by improving stability of the disk drive rotation will be described.

Only the command for driving the spindle motor is stored in the memory 22 (step 110). Then, the current disk drive mode is determined and whether a command has been input during the sleep mode (steps 120 and 130). As a result, when a command has been input in the sleep mode, chips controlled by the system controller 21 are enabled to change modes from a sleep mode to a wake-up mode (step 140).

The chips included in the CD-ROM are then enabled, and if the command is for driving the spindle motor, the spindle motor is energized via the servo unit 24 (steps 150 and 160). The energized spindle motor drives the disk (not shown). Then, the disk drive controller stands by for a predetermined time to allow stabilization, and then the received command is performed (steps 170 and 180).

However, when the received command is not for driving the spindle motor, the standby time is not required because there is no need to insure stable control of the disk drive rotation. Accordingly, the received command is performed (step 180) without the steps 160 and 170 of driving the disk and standing by.

According to the present invention, when the received command for interrupting the sleep mode requires the disk to be driven, the disk drive controller is stabilized, and then the received command is performed. The received command is classified in the initial stages of a wake-up mode as to whether the received command calls for driving of the disk or not, thus determining whether disk drive speed stabilization is necessary. Accordingly, malfunction during the step of performing a command in the initial stages of a wake-up mode due to instability of the disk drive controller is prevented.

Although the present invention has been described in terms of a preferred embodiment, it will be understood by those of skill in the art that various modifications may be made to the described embodiment without departing from the spirit and scope of the invention.

What is claimed is:

1. A method of controlling a disk drive during initial stages of a wake-up mode which interrupts a sleep mode, the disk drive having a microprocessor, the method comprising the steps of:

(a) determining whether a command is input to the microprocessor in the sleep mode;

(b) enabling predetermined circuits which have been disabled during the sleep mode by applying power from a power supply to the predetermined circuits, if it is determined in said step (a) that an input command exists;

(c) determining whether said input command is for picking up data from the disk and driving the disk to process the data;

(d) performing said input command without standing by, if it is determined in said step (c) that said input command is not for picking up data from the disk and driving the disk; and (e) standing by for a predetermined time period and then performing said input command, if it is determined in said step (c) that said input command is for picking up data from the disk and driving the disk.

2. The method according to claim 1, wherein said predetermined time period is of a duration sufficient to allow rotation of a disk in the disk drive to stabilize to a predetermined speed.

3. The method according to claim 1, wherein the method is implemented by means of the microprocessor.

4. The method according to claim 1, wherein the determination in said step (c) is made by comparing said input command to a command stored in advance in a memory.

5. An apparatus for controlling a disk drive to prevent malfunction during performing of a received command coinciding with initial stages of a wake-up mode, the apparatus comprising:

a memory in which a reference command for driving a disk is stored;

an interface for interconnecting said memory and a system controller; and said system controller for driving the disk arranged within said disk drive, comparing received commands to said reference command in said memory through said interface, and performing the particular received command;

whereby the received command is performed (i) after a predetermined time signal for a standby time period is generated by the controller in the event the received command coincides with said reference command stored in the memory, or (ii) otherwise immediately upon being received.

6. The apparatus according to claim 5, wherein said system controller includes a microprocessor.

7. The apparatus according to claim 5, wherein said predetermined timing signal for a standby time period is of a duration sufficient to allow rotation of a disk in the disk drive to stabilize to a predetermined speed.

8. In an apparatus for controlling a disk drive to prevent malfunction during performance of a received command coinciding with initial stages of a wake-up mode which interrupts a sleep mode, comprising:

a servo unit for driving a disk arranged within said disk drive;

a memory in which a reference command for driving the disk is stored;

an interface for interconnecting said memory; and a system controller including a microprocessor;

wherein said sleep mode comprises the steps of:

interrupting the power supply to said servo unit and other predetermined circuits related to the system controller, by said system controller, in order to reduce power consumption;

initiating said power supply interruption by said system controller automatically when no command is input to said system controller within a predetermined period of time;

said system controller for driving the disk arranged within said disk drive, comparing received commands to said reference command in said memory through said interface, and performing the particular received command;

the method of controlling a disk drive during initial stages of the wake-up mode by said system controller, comprising the steps of:

(a) determining whether a command is input to the microprocessor in the sleep mode;

(b) enabling the predetermined circuits which have been disabled during the sleep mode by applying power from a power supply to the predetermined circuits, if it is determined in said step (a) that an input command exists;

(c) determining whether said input command is for picking up data from the disk and driving the disk to process the data by comparing through said interface, said input command to said reference command for driving the disk stored in said memory;

(d) performing said input command immediately upon receipt, without standing by, if it is determined in said step (c) that said input command is not for picking up data from the disk and driving the disk; and (e) standing by for a predetermined time period and then performing said input command, if it is determined in said step (c) that said input command is for picking up data from the disk and driving the disk.

* * * * *